Figure 1A:
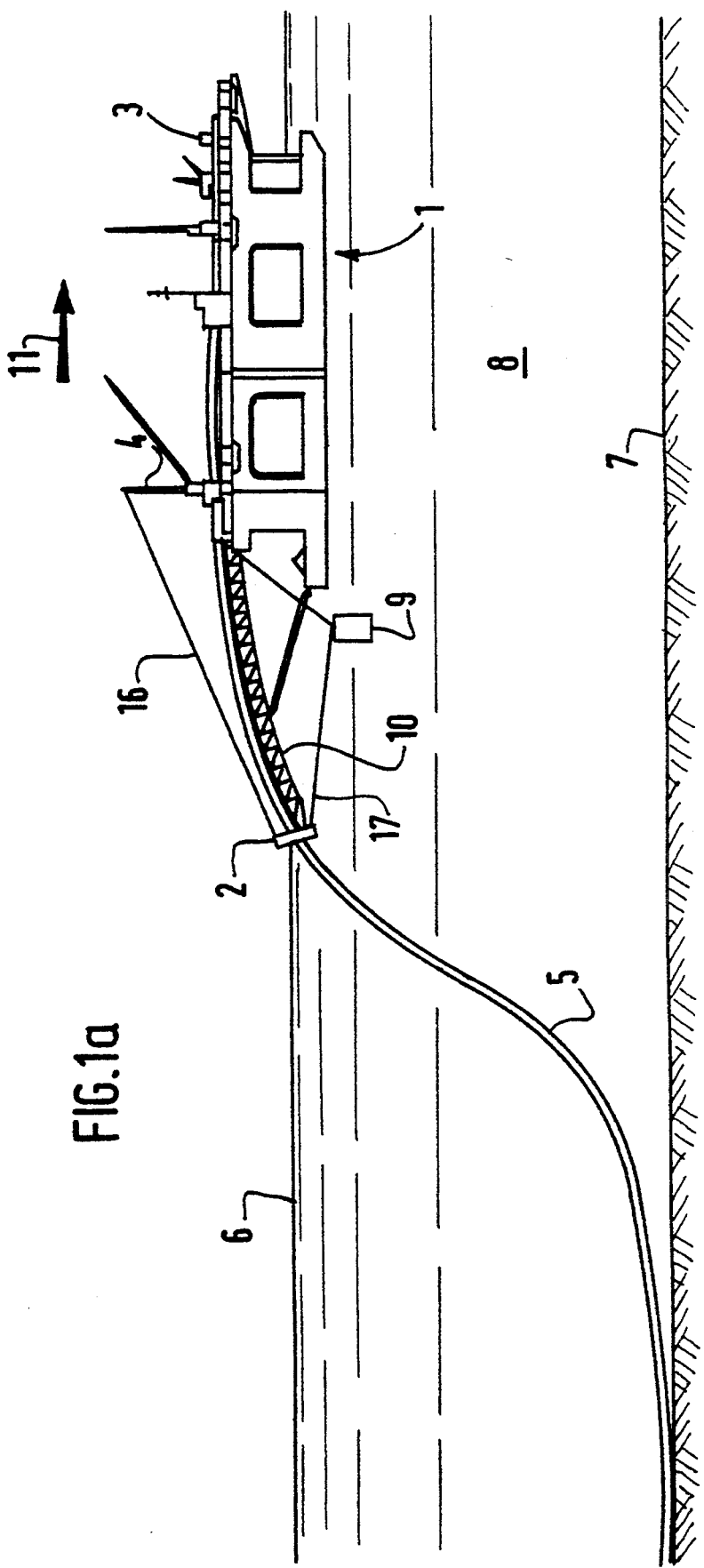

United States Patent [19]

Maloberti et al.

[11] Patent Number: 5,449,252
[45] Date of Patent: Sep. 12, 1995

[54] DEVICE FOR LAYING TUBULAR CONDUITS COMPRISING A SUBMERGED MOBILE PINCER AND METHOD USING SUCH A DEVICE

[75] Inventors: René Maloberti, Champigny; Alain Coutarel, Paris, both of France; Philippe Espinasse, Houston, Tex.

[73] Assignee: Coflexip, Boulogne Billancourt, France

[21] Appl. No.: 927,296

[22] PCT Filed: Apr. 2, 1991

[86] PCT No.: PCT/FR91/00262

§ 371 Date: Apr. 19, 1993

§ 102(e) Date: Apr. 19, 1993

[87] PCT Pub. No.: WO91/15698

PCT Pub. Date: Oct. 17, 1991

[30] Foreign Application Priority Data

Mar. 30, 1990 [FR] France ................... 90 04104

[51] Int. Cl.⁶ ............................................. F16L 1/14
[52] U.S. Cl. ................................. 405/166; 405/168.1
[58] Field of Search ............... 405/158, 166, 168.1, 405/168.4, 169, 170

[56] References Cited

FOREIGN PATENT DOCUMENTS

| 2430385 | 3/1980 | France . |
| 2730944 | 1/1978 | Germany . |
| 1204715 | 2/1970 | United Kingdom . |
| 2052673 | 4/1981 | United Kingdom . |
| WO91/15698 | 10/1991 | WIPO . |

Primary Examiner—David H. Corbin
Attorney, Agent, or Firm—Hoffman, Wasson & Gitler

[57] ABSTRACT

A device for laying tubular conduits from a floating support including a pair of clamps for gripping the tubular conduit. Each clamp can alternately provide a restraining force on the tubular conduit to be laid. The device is characterized in that one of the clamps can move relative to the floating support and is submerged.

7 Claims, 6 Drawing Sheets

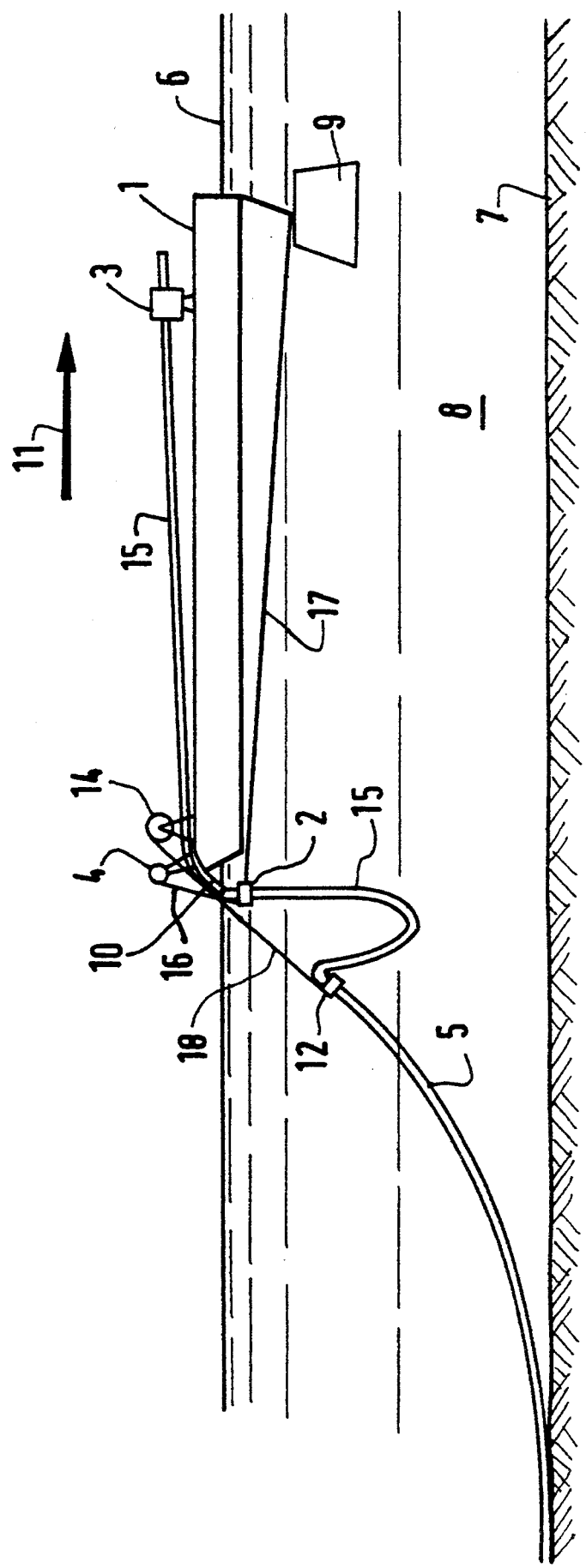

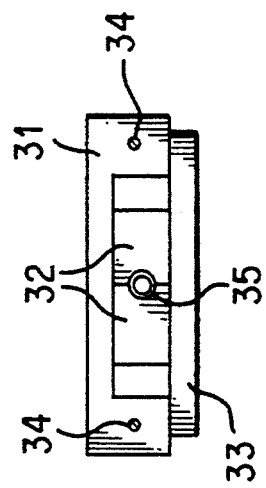
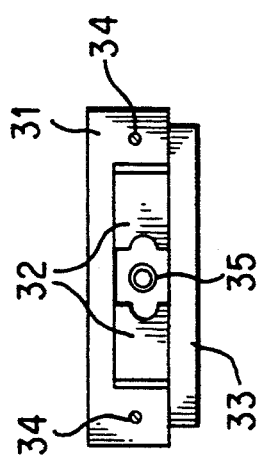
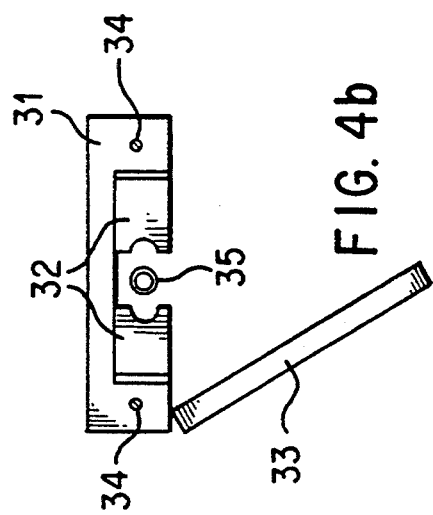
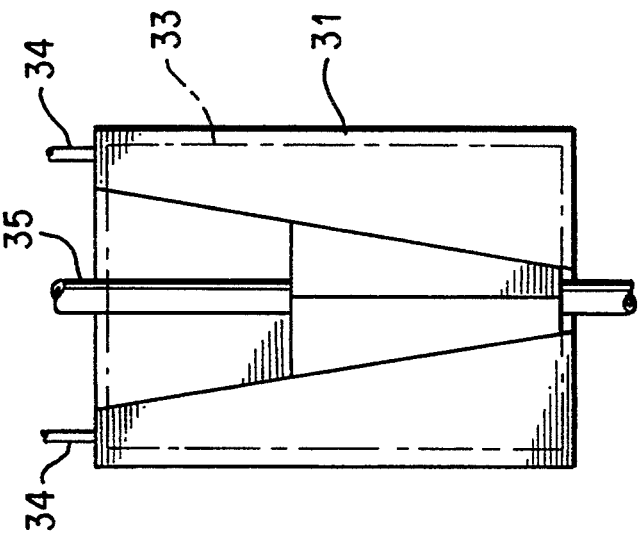
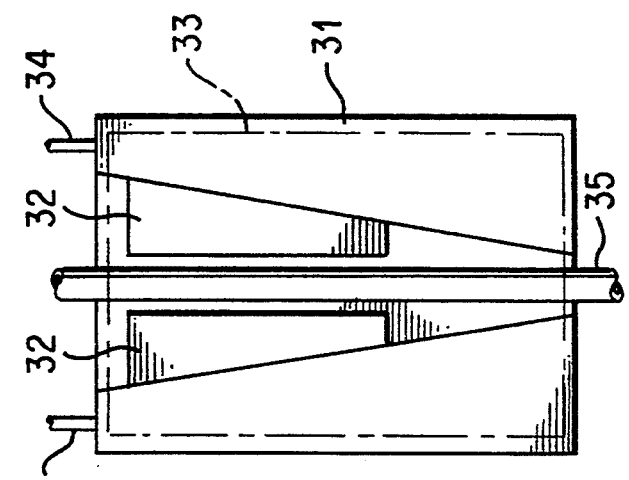
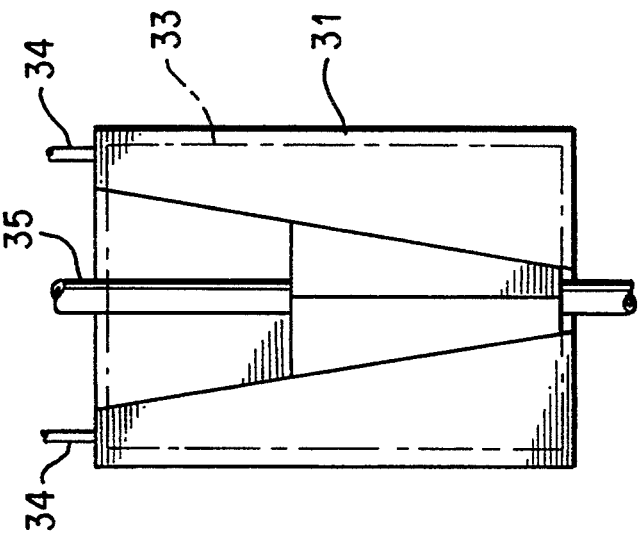

DEVICE FOR LAYING TUBULAR CONDUITS COMPRISING A SUBMERGED MOBILE PINCER AND METHOD USING SUCH A DEVICE

The invention mainly relates to a device for laying tubular conduits, in particular flexible tubular conduits or cables, comprising a submerged mobile pincer and to the method using such a device.

It is known to use devices for laying tubular conduits onto ocean beds, these laying devices comprising two pincers mounted on a frame, one being fixed, and the other being mobile relative to the frame. Such devices have a considerable bulk and a small lay length, that is to say they enable a small length of tubular conduits to be laid in each operating cycle comprising the steps of successively releasing both pincers.

There is known, from the French Patent 78 19879 (published under the No. 2,430,385), a handling device for lowering and raising cables or tubular conduits in installations for oil drilling. This device comprises a fixed pincer and a mobile pincer which are mounted on a frame. However, the mobility of the pincer is obtained by the control of jacks comprising a very short travel.

The device according to the present invention does not have the disadvantages of the devices of the known type. In fact, the use of a submerged mobile pincer makes it possible to obtain a long travel under water. The mobile pincer does not therefore take up any space on the floating support for laying tubular conduits. A device of small bulk is therefore obtained which nevertheless exhibits a considerable travel, for example of between 30 and 100 m, typically 50 m. It is to be noted that both advantages of the device according to the present invention, namely the small bulk and the considerable advancing lay length, were considered as totally contradictory and unattainable simultaneously.

The fact of having available a device which is compact, and of high performance nevertheless, enables it to be added as a complementary laying device, for example on a barge intended for the laying of rigid tubular conduits. This device makes it possible to lay a pipework comprising a rigid tubular conduit and a flexible tubular conduit which are joined together. It is thus possible to benefit from the good points characteristic of each type of tubular conduit or to benefit from the advantages of their laying method. For example, the rigid tubular conduit, the manufacturing cost of which is low, is laid on the portion of the route where the laying of a rigid pipeline does not present any problem. A flexible tubular conduit is joined for example for the connection to a production or drilling platform. Benefits additional to the good points characteristic of the flexible tubular conduit are, the high performance of the advanced laying ships used during the laying and comprising for example devices for dynamic positioning. Only such ships may work without danger in congested areas.

The laying method according to the present invention will use the barge, normally intended for the laying of rigid tubular conduits, in order to lay a length of flexible tubular conduits which is sufficient to reach the surface.

The end of the flexible tubular conduit opposite the rigid tubular conduit is either abandoned on the bottom with a view to its subsequent recovery, or transhipped on board an improved ship for laying flexible tubular conduits in order to continue the laying operations.

The use of a special laying ship to lay flexible tubular conduits makes it possible furthermore to benefit from an extremely quick laying relative to the laying of tubular conduits using barges.

It is to be noted that the device for laying rigid tubular conduits present on the barge is not normally suitable for laying flexible tubular conduits. In fact, the device responsible for clamping when rigid tubular conduits are being lowered would not make it possible to immobilize or to brake the flexible tubular conduits when they were being lowered. In the device according to the present invention use is made for example of clamping pincers or of clips having grips the opening and closing of which are controlled by jacks.

Advantageously, a submerged pincer is made to move by using steel cables wound-up on winches.

Advantageously, when the submerged pincer is released, it is prevented from rotating about the tubular conduit. For example, the submerged pincer is connected to a counterweight by a cable.

The characteristics of the device and of the method according to the invention are the subject of claims 1 and 10 respectively.

Figure 1B:
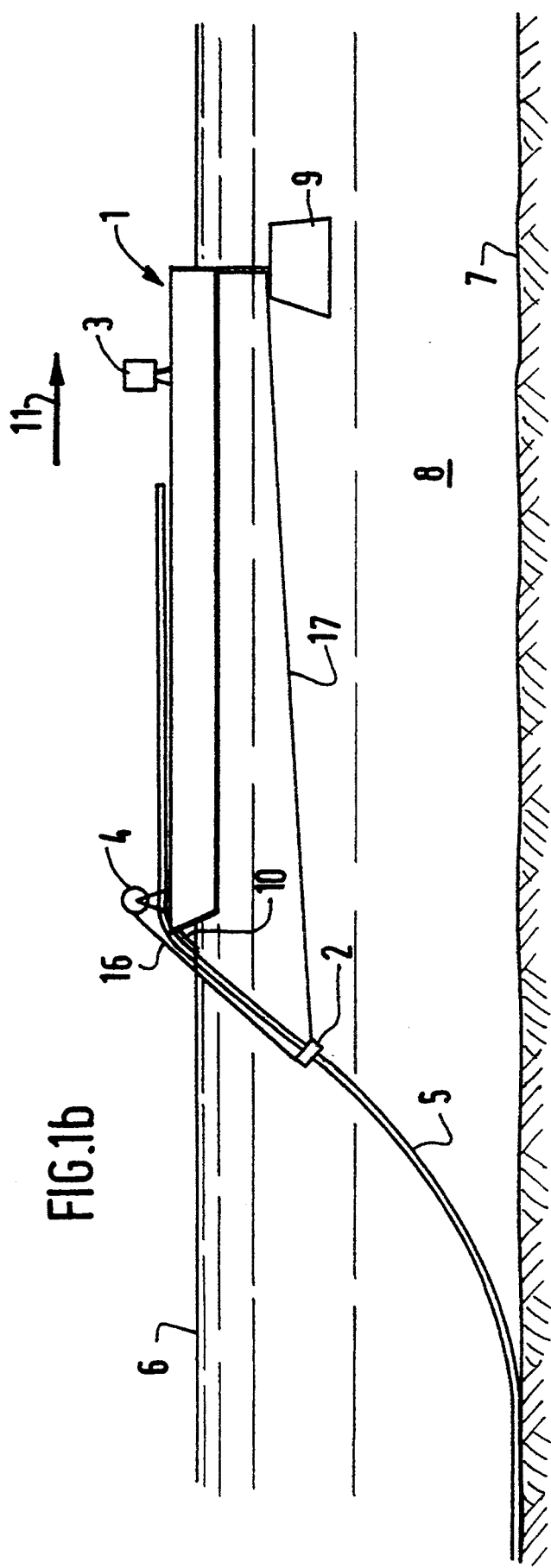
Figure 2B:
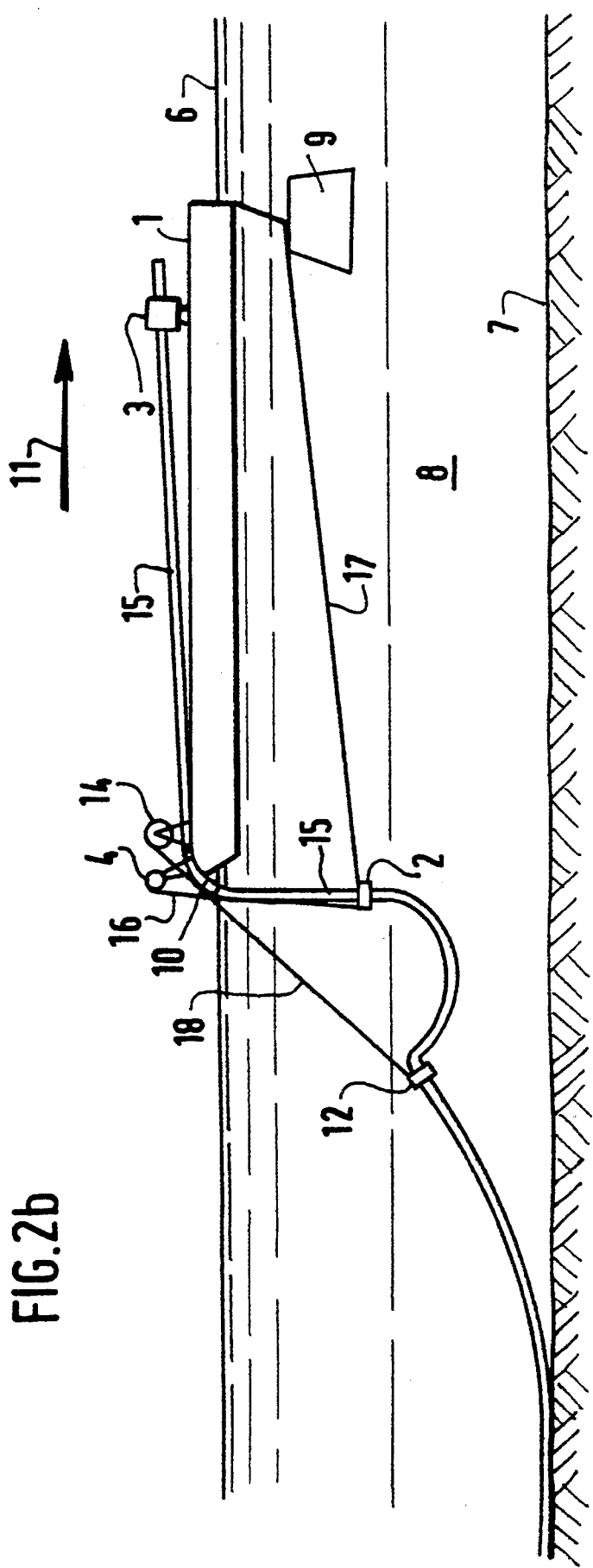

The invention will be better understood by means of the following description and of the attached figures, given as non-limiting examples, in which:

FIGS. 1*1* and 2*b* are diagrams depicting the laying of homogeneous rigid tubular conduits;

FIGS. 2*a* and 2*b* are diagrams depicting the laying of flexible tubular conduits or of a transition involving rigid tubular conduits and flexible tubular conduits.

Figure 3:
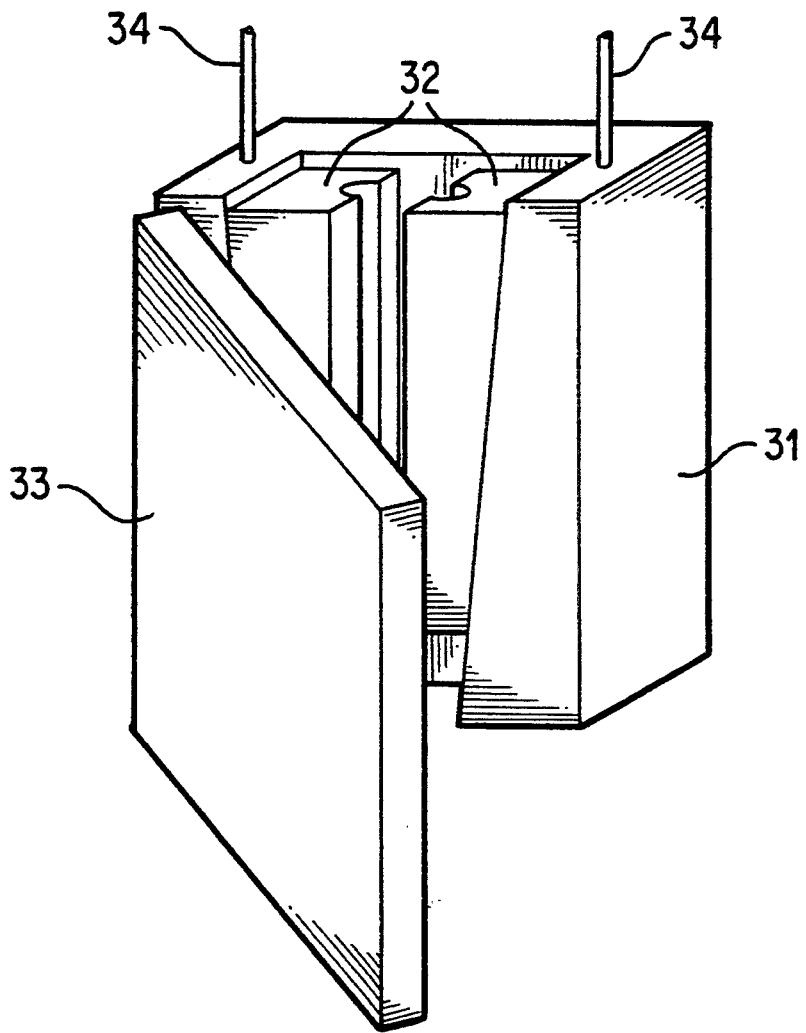

FIG. 3 is a perspective view of the pincers.

FIGS. 4*a* and 4*b* are top and front views, respectively, of the pincer shown in FIG. 3 showing a first step of operation.

FIGS. 5*a* and 5*b*, respectively, are top and front views of the pincer as shown in FIG. 3 in a second step of operation.

FIGS. 6*a* and 6*b* are top and front views, respectively, of the pincer as shown in FIG. 3 in a third step of operation.

The same reference numerals have been used in FIGS. 1 and 2 to designate the same elements.

The use of the device according to the present invention for laying rigid tubular conduits 5, for example on the bottom 7 of the sea 8 may be seen in FIG. 1. In the example depicted in FIG. 1, the device according to the present invention equips a barge 1 for laying rigid tubular conduits. The barge 1 comprises a support in the form of an inclined ramp 10 making it possible to impose the desired inclination on the tubular conduit 5 when it penetrates the surface of the water 8. The barge 1 comprises a pincer 3 located "astern" in the non-limiting example depicted in FIG. 1. A submerged pincer 2 is connected by holding means 16 to controlling means 4 enabling it to be lowered and/or raised. The means 16 comprise for example a steel cable, while the means 4 comprise for example a winch. Advantageously, the device according to the present invention is located on one side of the barge 1. The rigid tubular conduit 5 substantially takes up an S shape.

Advantageously, the submerged pincer 2 is connected, for example by a cable 17, to a counterweight 9 attached to the barge 1. Thus, it will always keep the same orientation, even during a displacement, for example a raising, the pincer 2 not being clamped around the tubular conduit 5.

In order to lower the conduit 5, the pincer 3 (FIG. 1a), which prevents the lowering of the tubular conduit 5, is first clamped. The pincer 2 is clamped around the tubular conduit 5. Once the pincer 2 is clamped around the tubular conduit 5, the fixed pincer 3 is released. The pincer 2 is lowered by unwinding the steel cables 16 from the winch 4. The barge 1 advances simultaneously in the direction of the arrow 11. The pincer 2 has been depicted in its low position in FIG. 1b. A new section is joined, for example by welding, to the end of the rigid tubular conduit 5. This section advantageously has a length substantially equal to the length of the barge 1. Likewise, the travel of the pincer 2 is substantially equal to the length of the barge 1 (unlike the example depicted in FIG. 1). Once a new section of the tubular conduit 5 has been joined (not depicted in FIG. 1b), the pincer 3 is clamped. At that point, the pincer 2 which is raised by means of the winch 4 and of the cable 16 is released. Advantageously, the cable 17 stretched between the pincer 2 and the counterweight 9 prevents the rotation of the mobile pincer 2 about the tubular conduit 5. Once the pincer 2 is in the high position, the beginning of the cycle depicted in FIG. 1a is arrived at once again.

Referring to FIG. 3, the pincers 2 and 3 include a main frame 33 surrounding two movable key-shaped jaws 32. The pincers are provided with a door 33 and maneuvering cables or hydraulic jacks 34. A flexible conduit 35 is positioned between the two movable key-shaped jaws 32. Referring to FIGS. 4–6, the door 33 is open and the jaws 32 are in an open position allowing the pincer to be placed around the conduit 35 (FIGS. 4a and 4b). In FIG. 5, the door 33 is closed while the jaws 32 remain open allowing translation of the pincer along the conduit 35. In FIG. 6, the jaws 32 are closed to grip the conduit 35. In FIG. 4, the door 33 is open, and therefore is not shown. The door 33 is shown in FIGS. 5 and 6 by a dotted line since the door 33 is closed.

An example of laying a pipework comprising a rigid tubular conduit 5 and a flexible tubular conduit 15 which are joined together may be seen in FIG. 2. The length of the flexible tubular conduit 15 is slightly greater than the depth of the bottom 7 so as to take into account the catenary shape of the flexible conduit. Once the joint has been produced, the continuation of the laying of flexible tubular conduits 15 will advantageously be carried out by means of a ship specialized in the laying of flexible tubular conduits.

The rigid tubular conduit 5 is held by a second pincer 12 connected by a cable 18 to a winch 14. The flexible tubular conduit 15 is held, on the one hand, by the end of the rigid conduit 5, and on the other hand by a submerged pincer 2 and/or by a pincer 3 placed on the barge 1. The flexible tubular conduit 15 substantially takes up the shape of a catenary under the effect of its own weight.

In FIG. 2a, the submerged pincer 2 has been depicted in its high position. Once the pincer 2 is clamped around the flexible tubular conduit 15, the pincer 3 may be unclamped. The simultaneous lowering of the rigid tubular conduit 5 is carried out by unwinding the cable 18 from the winch 14, and the lowering of the flexible tubular conduit 15 is carried out by unwinding the cable 16 from the winch 4.

The pincer 2 has been depicted in its low position in FIG. 2b. At this point, the pincer 3 is clamped around the flexible tubular conduit 15, the pincer 2 is released and is raised. In the example depicted in FIG. 2, the pincer 3 is located near the bow (according to the direction of the arrow 11) of the floating support 1. In practice, this is not at all necessary. As the flexible tubular conduit 15 is progressively lowered, it is unwound, for example from the storage means of the "basket" or "cable drum" type (not shown in FIG. 2).

Advantageously, when the pincer 12 has reached the bottom 7, it is released and raised by the winch 14.

Once the end of the rigid tubular conduit rests on the bottom, the upper end of the flexible tubular conduit 15 lying ready on the floating support 1 is advantageously transhipped onto a ship specialized in the laying of flexible tubular conduits, for example a quick-laying ship comprising means for dynamic positioning. The continuation of the operations of laying flexible tubular conduits will be carried out using this ship (not depicted in the figures). However, the abandonment of the end of the flexible tubular conduit 15 on the bottom is not beyond the scope of the present invention. Advantageously, such an end abandoned on the bottom will comprise means facilitating its recovery such as for example connection devices and/or locating means. The locating means will comprise for example a sonar beacon. For example, a passive sonar beacon will be used for abandonments of long duration, and an active sonar beacon will be used for abandonments of short duration.

We claim:

1. A device for laying a tubular conduit on the ocean bed, comprising a floating support and a pair of pincers which are each capable of assuming an open position and a closed position around the tubular conduit and which may be activated alternately in order to lay the conduit step by step, each of the pincers being capable, in the closed position, providing the forces for holding the conduit to be laid, wherein one of the pincers (3) is placed on the floating support (1) and the other pincer (2) is submerged and connected to the floating support by a holding means (16) associated with controlling means (4) placed on the floating support wherein:

said submerged pincer (2) is in the closed position to clamp the tubular conduit (5, 15) to be lowered and enable a corresponding link of the conduit to be submerged while taking up the axial traction exerted by the conduit and, said submerged pincer (2) is in the open position to raise said submerged pincer by sliding the latter around said conduit.

2. The device as claimed in claim 1, wherein said submerged pincer (2) has the shape of an at least partial ring.

3. The device as claimed in claim 1, wherein the holding means are cables (16), and the controlling means comprise a winch (4).

4. The device as claimed in claim 1, which comprises means (9) for preventing the rotation of the submerged pincer (2) about the longitudinal axis of the conduit when it is being raised.

5. The device as claimed in claim 4, wherein said means for preventing the rotation of the submerged pincer comprise a counterweight (9) connected to said submerged pincer (2).

6. The device as claimed in claim 1, wherein the tubular conduit is a flexible tubular conduit joined to the end of a previously laid rigid tubular conduit, the device comprising another pincer (12) which is capable of assuming an open position and a closed position, said other pincer (12) being installed on the rigid tubular conduit near its joint with the flexible tubular conduit and being connected to the floating support by holding means associated with controlling means (14) placed on the floating support.

7. A method for laying a tubular conduit on the ocean bed using the device according to claim 1, which comprises at least one cycle consisting in:
   clamping the submerged pincer (2) around a tubular conduit (5, 15);
   releasing the pincer (3) placed on the floating support;
   activating the controlling means (4) to lower the submerged pincer (2) and enabling a corresponding length of conduit to be submerged;
   stopping the lowering;
   clamping the pincer (3) placed on the floating support around the tubular conduit;
   releasing the submerged pincer (2);
   activating the controlling means (4) to raise the submerged pincer (2).

* * * * *